US011825954B2

(12) United States Patent
Kirchhoff (10) Patent No.: US 11,825,954 B2
(45) Date of Patent: Nov. 28, 2023

(54) SHAPED BODY MADE FROM A FOAM AND SPRINGS AS WELL AS USES THEREOF

(71) Applicant: VARIOWELL DEVELOPMENT GMBH, Muenster (DE)

(72) Inventor: Tobias Kirchhoff, Muenster (DE)

(73) Assignee: VARIOWELL DEVELOPMENT GMBH, Muenster (DE)

( * ) Notice: Subject to any disclaimer, the term of this patent is extended or adjusted under 35 U.S.C. 154(b) by 0 days.

(21) Appl. No.: 17/043,178

(22) PCT Filed: Apr. 26, 2019

(86) PCT No.: PCT/EP2019/060718
§ 371 (c)(1),
(2) Date: Sep. 29, 2020

(87) PCT Pub. No.: WO2019/207097
PCT Pub. Date: Oct. 31, 2019

(65) Prior Publication Data
US 2021/0137277 A1    May 13, 2021

(30) Foreign Application Priority Data
Apr. 27, 2018   (LU) ........................................ 100788

(51) Int. Cl.
*A47C 27/20* (2006.01)
*A47C 27/14* (2006.01)
(Continued)

(52) U.S. Cl.
CPC ............ *A47C 27/20* (2013.01); *A47C 27/148* (2013.01); *A47C 31/123* (2013.01); *A47C 23/0435* (2013.01)

(58) Field of Classification Search
CPC . A47C 23/0435; A47C 31/123; A47C 27/083; A47C 27/148; A47C 27/20; F16F 3/12
See application file for complete search history.

(56) References Cited

U.S. PATENT DOCUMENTS 2,469,596 A * 5/1949 Groom ............... A47C 23/0433
267/143
3,145,020 A * 8/1964 Calla ...................... A47C 27/20
267/143
(Continued)

FOREIGN PATENT DOCUMENTS

CA            449744 A      7/1948
EP         0180244 A2 *    5/1986
(Continued)

OTHER PUBLICATIONS

Chinese Office Action dated Oct. 10, 2022 for family member Application No. CN201980028346.

*Primary Examiner* — Robert G Santos
(74) *Attorney, Agent, or Firm* — Hudak, Shunk & Farine Co. LPA (57) ABSTRACT

A shaped body having at least one spring and at least one foam section. The uppermost section of the foam section is attached to the uppermost section of the at least one spring, and the lowest section of the foam section is attached to the lowest section of the at least one spring. The shaped body may be a viscoelastic foam and may include a temperature-regulating device arranged in thermal contact with the foam section and a control device for the temperature-regulating device adapted to adjust the firmness of the foam section by alteration of temperature. The shaped body is used as a bed or mattress for promoting sleep in one application or as a cushion.

19 Claims, 4 Drawing Sheets

(51) Int. Cl.
*A47C 31/12* (2006.01)
*A47C 23/04* (2006.01)
*A47C 23/043* (2006.01)

(56) References Cited

U.S. PATENT DOCUMENTS

| | | | | |
|---|---|---|---|---|
| 4,154,786 | A * | 5/1979 | Plasse | B68G 11/06 |
| | | | | 264/46.7 |
| 4,862,540 | A * | 9/1989 | Savenije | A47C 27/20 |
| | | | | 5/655.9 |
| 5,148,706 | A * | 9/1992 | Masuda | A47C 31/123 |
| | | | | 600/587 |
| 5,222,264 | A * | 6/1993 | Morry | A47C 27/063 |
| | | | | 267/95 |
| 6,223,370 | B1 * | 5/2001 | Kluft | A47C 27/066 |
| | | | | 5/717 |
| 6,272,706 | B1 * | 8/2001 | McCune | F16F 1/364 |
| | | | | 5/655.8 |
| 6,719,708 | B1 | 4/2004 | Jansen | |
| 7,140,478 | B2 * | 11/2006 | Barvosa-Carter | B61G 11/12 |
| | | | | 188/267.2 |
| 7,917,980 | B2 * | 4/2011 | Kluft | A47C 27/20 |
| | | | | 5/717 |
| 8,499,389 | B2 | 8/2013 | Kirchhoff | |
| 2004/0025258 | A1 | 2/2004 | Van Der Wurf et al. | |
| 2009/0100606 | A1 | 4/2009 | An | |
| 2011/0000018 | A1 * | 1/2011 | Kirchhoff | A47C 27/148 |
| | | | | 219/490 |
| 2014/0165292 | A1 | 6/2014 | Gladney | |
| 2014/0189951 | A1 * | 7/2014 | DeFranks | A47C 27/064 |
| | | | | 5/423 |
| 2015/0296992 | A1 * | 10/2015 | Ghanei | A47C 27/15 |
| | | | | 5/423 |
| 2015/0342362 | A1 * | 12/2015 | DeMoss | A47C 27/20 |
| | | | | 5/718 |
| 2017/0135494 | A1 * | 5/2017 | DeFranks | A47C 31/123 |
| 2018/0344046 | A1 * | 12/2018 | DeFranks | A47C 27/18 |
| 2021/0137277 | A1 * | 5/2021 | Kirchhoff | A47C 23/0435 |
| 2023/0103421 | A1 * | 4/2023 | Kirchhoff | A47C 21/048 |
| | | | | 5/421 |

FOREIGN PATENT DOCUMENTS

| | | | | |
|---|---|---|---|---|
| GB | 2052677 A * | 1/1981 | | F16F 3/12 |
| GB | 2052677 A | 1/1981 | | |
| JP | S50-060208 U | 8/1978 | | |
| JP | S57-179869 U | 11/1982 | | |
| JP | 2001149185 A | 6/2001 | | |
| JP | 2003299554 A | 10/2003 | | |
| NL | 8101008 A | 10/1982 | | |
| WO | WO-03101257 A1 * | 12/2003 | | A47C 27/001 |
| WO | WO-2010075289 A2 * | 7/2010 | | A47C 21/042 |
| WO | WO-2010075291 A1 * | 7/2010 | | A47C 21/042 |
| WO | WO-2019207097 A1 * | 10/2019 | | A47C 23/0435 |
| WO | WO-2019207097 A9 * | 12/2019 | | A47C 23/0435 |
| WO | WO-2021240012 A1 * | 12/2021 | | A47C 21/048 |

* cited by examiner

SHAPED BODY MADE FROM A FOAM AND SPRINGS AS WELL AS USES THEREOF

CROSS REFERENCES TO RELATED APPLICATIONS

This application claim benefit of and priority to Luxembourg Patent Application No. LU 100788 filed on 27 Apr. 2018 "A shaped body made from a foam and springs as well as uses thereof".

FIELD OF THE INVENTION

The invention relates to a shaped body comprising a spring and foam and uses thereof.

BACKGROUND OF THE INVENTION

Mattresses such as those formed of polyurethane foam, latex foam, and the like, with or without coiled springs, are generally known in the art. One of the ongoing problems associated with mattress assemblies is user comfort. To address the issues of user comfort, these mattresses are often fabricated with multiple foam layers having varying properties, such as density and hardness, among others, to suit the needs of the intended user. More recently, manufacturers have employed so-called memory foams, also commonly referred to as viscoelastic foams. These foams are often structures having both closed and open cells but, in some instances, may be reticulated foam structures. When used in a mattress, the memory foam conforms to the shape of a user when the user exerts pressure onto the foam, thereby minimizing pressure points from the user's body. The memory foam then returns to its original shape when the user and associated pressure on the memory foam is removed. However, the return to the original shape of the memory foam is a relatively slow process because of the viscoelastic cellular structure of these types of foams.

As is known, a polyurethane is formed from the reaction from a polyol (an organic compound having multiple groups) with a di- or poly-isocyanate. Examples of a di-isocyanate is TDI or toluene di isocyanate. An example of a poly-isocyanate is MDI or methlyendiphenyl-isocyanate. A polyurethane form formed from MDI with a polyol may have the aforementioned viscoelastic properties.

One example of a prior art mattress is disclosed in US Patent Application No. 2014/165292 (Gladney, assigned to Dreamwell Ltd) which teaches a mattress comprising at least one coiled spring layer and an underlaying support layer of a viscoelastic foam in which the coiled spring layer is in direct contact with the viscoelastic form. Another example of a prior art seat base or bed support is known from U.S. Pat. No. 8,499,389.

It is known from the prior art that springs and foams can be connected in a serial manner. For example, U.S. Pat. No. 7,917,980 (Klufit) teaches a foam encasement which surrounds an innerspring unit having a plurality of springs. The mattress construction shown in this US patent is said to improve comfort by combining the properties of the foam and the springs. This construction of combining the properties of the springs and the foam on top of each other is felt by the user. The uppermost part of the construction is mostly made of foam and is the primary contact material felt by the user and which reacts initially under load of the user. The secondary material is below (and is mostly springs) and only reacts once the foam transfers the load of the user due to the body weight further downwards. This means that the foam is already partly compressed. The foam and the springs in this construction can move independently from each other and are not attached to each other.

Another example is disclosed in US patent application 2015/342362 A1 (Demoss et al). This patent application teaches a pocket coil-spring assembly that includes an amount of flexible foam positioned in an interior cavity of the coil-spring and having a top surface that extends above the coil spring. There is no mention in this application of a connection between coil and spring. The figures show only that the coil-spring and the flexible foam touch each other at certain sections. The property of this construction to combine the flexible foam and the coil-spring is that the foam section reacts first under load as the flexible foam extends above the coil-spring and so the flexible foam is the primary factor for the comfort feeling of the user. This effect is wanted by the inventor as detailed in that document.

The spring and the foam are not connected to each other and so they can move independently from each other without being synchronized. By adding a pocket material made from inflexible material as described in the patent application, this pocket material will disturb the dynamic reaction to the load negatively as the pocket material is an inflexible material which will become "loose" under the load, without any dynamic reflection. The combination of the flexible foam and the coil-spring as shown in FIG. 2 of that document also shows no connection to synchronize the behavior of the coil spring and the flexible foam under dynamic load. The coil-spring and the flexible foam can move independently from each other especially when under low load. The patent document recommends that the flexible foam should fill all of the interior space within the coil-spring and so the flexible foam will expand under load outwards between the metal wire from which the coil spring is made. This expansion will change the behavior of the spring completely, as the flexible foam restricts and stops the movement of the coil spring, becoming very firm itself. A combination of foam and spring under load with the foam squeezed between the wire shows no "spring" or "flexible foam" feel but is just very firm and static without any dynamic response.

US patent application 2015/296992 A1 (Ghanei et al) describes a mattress without springs but a channel in the base section which—in connection with a fan—is said to provide cooling.

Dutch Patent NL 8 101 008 A (Uden & Bicker) teaches an interior mattress with a large number of wire springs axially extending between the mattress top and the bottom of the mattress formed with wire and elastic material with the elastic material to extend over at least the major part of the axial wire spring length. This patent application fails to describe any attachment (i.e. bonding, adhesion, or other firm connection) of the foam and the spring components.

As known from the prior art patent application US 2015/342362 A1 the extension of the elastic material above the spring will lead to this elastic material section to react first and primarily to the load of a user of such a product in the Dutch Patent. There is no attachment between the spring and the elastic material, the spring and the elastic material only touch each other at various points, which might be at different points under load or not under load. This construction leads to the spring and the elastic material being able to move independently from each other under dynamic load. So, the elastic material could move up at a faster rate under pressure release, reducing any comfort effect of the spring which might expand at a slower rate. Furthermore, in this prior art document, the elastic material is shown to fill up mostly all space within the spring. This will lead the elastic material being able to extend between the wires of the springs, as described earlier.

Canadian Patent CA 449 744 A (Glenn) describes a spring consisting of a spring wire helix and a core of spongy elastic material inserted in and extending substantially the full height or length of the spring wire helix with the core "snugly fitting" when the spring is not loaded, but extending between the wires once the spring is under load. There is no description of any attachment between the spring and the spongy elastic material In a manner, similar to the disclosure in the patent application US 2015/342362 and NL8101008, this type of construction will not synchronize the effects of the elastic material and the spring as they can move independently from each other In this case the fact that the elastic material is supposed to squeeze out between the wire of the spring will lead to a static—non responsive—behavior of this construction under full load.

Furthermore, similar to the patent application CA 449 744 A, the UK patent application GB 2 052 677 A (Price Bros) also describes a composite spring comprising a coil spring coaxially enclosing a deformable core, at least some of the coils of the spring being in contact with the periphery of the core and deforming the surface of the core. As can be seen clearly from the figures in this patent application, the foam in the deformable core squeezes out between the wire of the spring under load, which is the 'deformed surface'. The disadvantages of such a combination of the spring and the foam as described in this patent application is outlined in the above paragraphs.

The analysis of the prior art can be summarized that the different dynamic parameters of each of the materials, i.e. foam and spring, to react under load due to the user was noted. As the foam material in the prior art disclosure is mostly positioned on top of or extending above the spring section, the "foam feeling" dominates the overall dynamic response of those combinations. The static behavior of a fully loaded combination of spring and foam with the foam creeping out between the wire of the spring was obviously accepted or even welcomed in prior art.

SUMMARY OF THE INVENTION

A shaped body is described in this document. The shaped body comprises at least one spring and at least one foam section. The uppermost section of the foam section is attached to the uppermost section of the at least one spring, and the lowest section of the foam section is attached to the lowest section of the least one spring. In other words, the foam section and the spring are attached in at least two places in a parallel fashion so that the shaped body acts as a single object on compression. The firm connections can either be made directly in which sections of the foam are attached directly to the spring, or through an intermediate element, such as a plate or similar firm material. The shaped body with the parallelly organized spring and foam section has effectively properties similar to that of a viscoelastic foam, i.e. it is both viscous being resistant to shear or strain when subjected to a force and being elastic and returning to its original shape on removal of the force.

During use as a mattress the pressures applied by the sleeper on an upper surface of the mattress are very different at different times, as the body weight of the sleeper is not distributed evenly over the upper surface of the mattress. Large surface areas pressured by the body of the sleeper are subject to only 1.0-2.0 kPa—for example, at the areas where legs, arms or the lordosis of the sleeper are located. Pressure in the hip or shoulder areas are mostly 3-0 to 4.5 kPa but can easily reach peak values at 7.0 to 8.0 kPa. These peak values are only affecting a rather small area of the body touching the upper surface of the mattress, these peak values determine the comfort feeling significantly of the mattress for the sleeper. It is these areas (shoulder and hip zone) that determine if the mattress is perceived as soft, firm or otherwise responsive, because these areas carry the largest percentage of body weight of the sleeper. So, if the foam section is designed such that the foam section is unable to squeeze out between the wire coils forming the spring, the foam section should not do so even if the shaped body is subject to forces between 1.0 to 8.0 kPa., when the sleeper is lying on the shaped body forming the mattress.

In one aspect, there is no need to use a viscoelastic foam in the shaped body. The viscoelastic foam would be affected by temperature and could even change its properties unpredictably with the presence of body heat. The viscoelastic foams are also impermeable to air and create therefore a feeling of heat or warmth which may be uncomfortable to a person sitting on a cushion or lying on a mattress. Furthermore, viscoelastic foams are more expensive than conventional foams.

In another aspect, it is possible to also use a viscoelastic foam in the shaped body and this will enable adjustment of the viscoelastic properties of the foam.

The shaped body can be used in a cushion for example on a chair, or as a mattress for a bed. It will be appreciated that these applications are, however, not limiting of the invention.

In one aspect, the foam section is positioned inside the spring. This protects the foam section from damage.

A temperature-regulating device is arranged in thermal contact with the at least one section of the foam section having thermoelastic properties; and a control device for the temperature-regulating device adapted to adjust the firmness of the foam section by alteration of temperature. This enables the firmness of at least part of the foam to be adjusted.

The shaped body with the thermoelastic foam section can have at least one of a horizontal channel or a vertical channel to enable air to circulate within the shaped body and cool the shaped body.

The shaped body with the thermoelastic foam section may also include a plurality of sensors to measure pressure applied to a surface of the shaped body.

In one aspect the spring comprises an inner section which is located completely within the spring and contains a foam section. The uppermost and lowest parts of the foam section and the spring are attached to each other and the foam section is designed to have a cross diameter sufficient smaller than the cross section of the spring, so that the foam will not creep or extend between the wire of the spring under load of maximum 0.5 N/cm$^2$.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
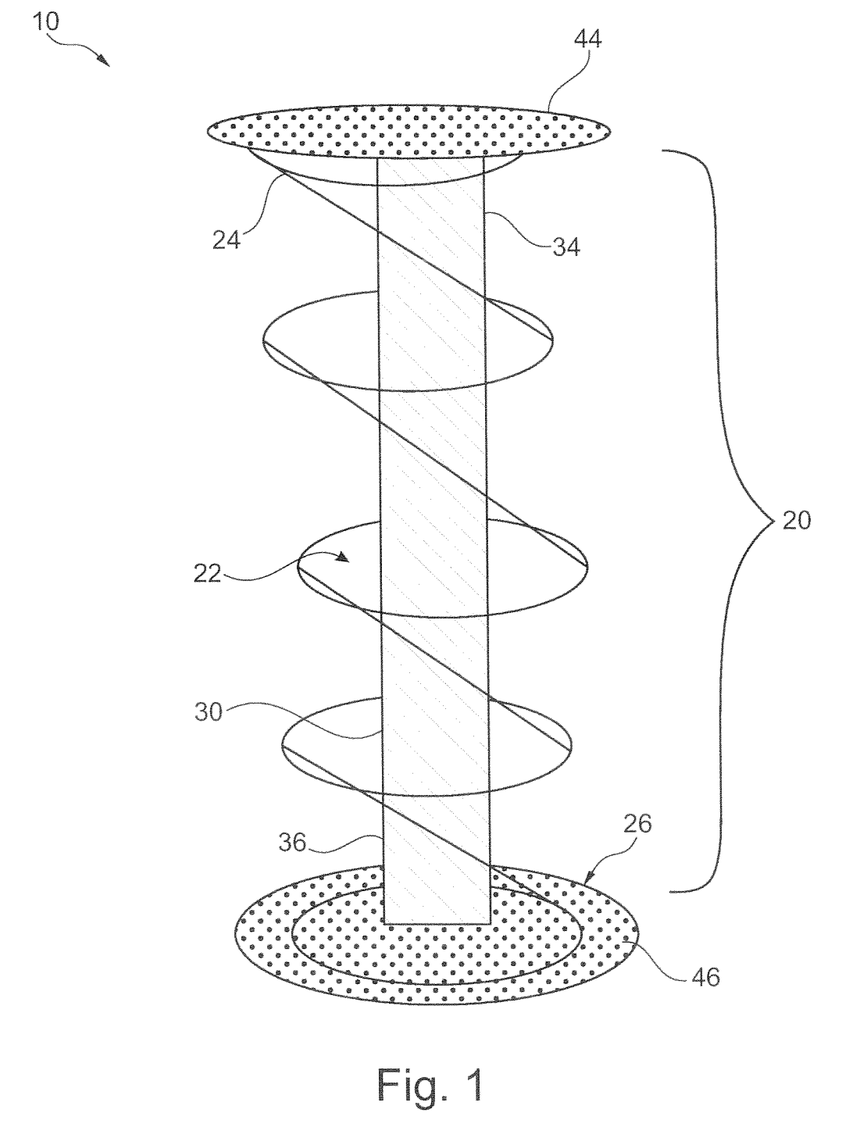
FIG. 1 shows a construction of a shaped body with a foam and springs.
Figure 2:
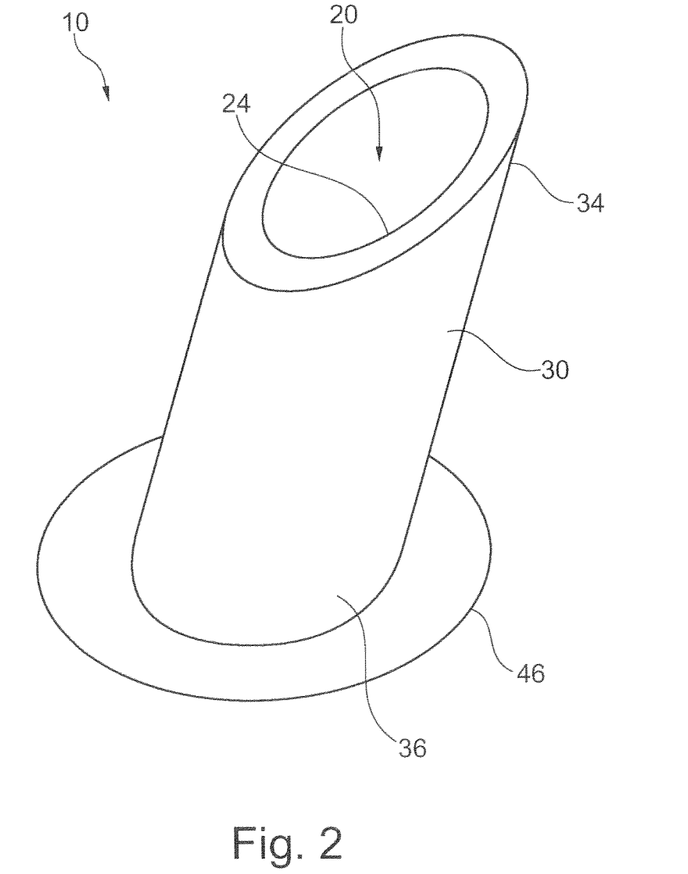
FIG. 2 shows an alternative construction of the shaped body.
Figure 3:
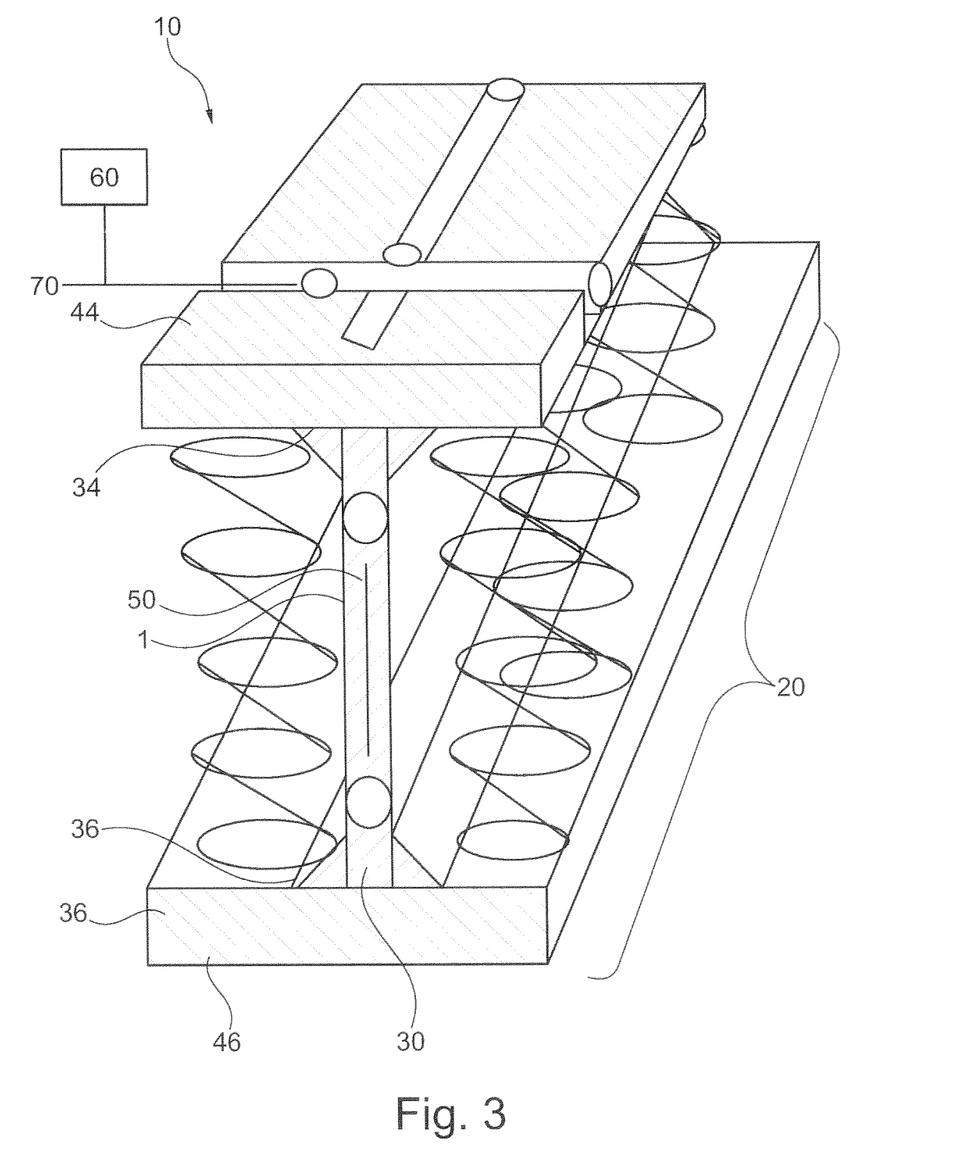
FIG. 3 shows a combination of a plurality of springs and the foam.

The present document teaches a shaped body 10 which comprises at least one spring 20 having an inner section 22 and one foam section 30 as is shown in FIGS. 1 to 3 and is suitable, for example, for use as a mattress for a bed or a cushion. The foam section 30 is either a conventional polyurethane foam or can be made from a viscoelastic foam, but this is not limiting the invention and other types of foam can be used in the shaped body. The viscoelastic foam has the property that it changes its dynamic properties on warming, as will be explained below. The conventional polyurethane foam does not change its dynamic properties on warming at typical room temperatures. It will be seen in FIG. 1 that the cross diameter of the foam section 30 is smaller than the cross-section of the inner section 22 of the spring 20.

The shaped body can be used in connection with a warming device, sensors and a controller to change the properties of the foam in the mattress or cushion, as explained below. This enables the use of such shaped bodies in areas which are close to surface of a product, such as in the mattress on the bed. The shaped bodies enable significant changes in the firmness of the bed and its mattress, which are substantially independent of the influence of body temperature on their firmness. This means that the foams can be placed close to the surface of the mattress of the bed, and therefore the changes in firmness are more perceptible during the use of the bed.

The thermoelastic foams together with a temperature changing device enabling the warming of the foams in the range from 20° C. to 50° C. and results in the product having changing properties. The inventors have established that the changes in the firmness of the foam itself are rapid and can be clearly noticed by the user, even with small changes in the temperature caused by the temperature changing device.

The combination of the spring 20 and the foam 30 described in this document behaves differently to the combinations described in the prior art. The forces of increasing load will reach the spring 20 and the foam 30 at the same time and will keep this synchrony all the way until both the spring 20 and the foam 30 are substantially completely compressed. Furthermore, the forces released by this combination of the spring 20 and the foam 30 under decreasing load towards the user will come from both the spring 20 and the foam 30 at the same time and keep this synchrony all the way until both the spring 20 and the foam 30 are fully expanded.

In the known prior art one of the components of either the spring 20 or the foam 30 is found to dominate the response to increasing or decreasing load at the beginning or at any time during compression and expansion, because the spring 20 and the foam 30 of the prior art can move independently from each other and the "firmer" part will dominate under compression and the part with the higher recovery force will dominate under expansion. The only "harmonized" reaction of both components in the prior art is the phase during which the foam is creeping or extending between the wire of the spring. This creeping out leads to a static non-responsive reaction of such a combination, as the two materials, i.e. the foam and the springs are blocking each other, and this blocking is unwanted.

The expression "uppermost" or "lowest" section of a spring or the foam is defined as the sections within this foam/spring combination. This combination can be glued to foam or spring on top or below this combination within a final product.

A shown in the example of FIGS. 1 to 3, an uppermost section 34 and a lowest section 36 of the foam 30 are attached to the springs 20 as this will enable the foam 30 to return to the original shape after removal of a load. The construction can include channels or holes in the foam 30 or elsewhere to allow warmer air to leave the section of the foam, based on the tendency of warmer air to rise.

As noted above, the shaped bodies with comfort features are made of the foam 30 with the springs 20. These springs 20 are mostly metal, although some plastic versions are available. The springs 20 are either attached to each other or are standing singly in pockets beside each other, as can be seen in FIG. 3. The springs 20 can be assembled in several layers horizontally placed on top of each other. In this latter case of several horizontal layers, each one of the horizontal layers may have a different firmness characteristic with the uppermost horizontal layer of the springs 20 being the softest one of the layers and the lowermost horizontal layer being the firmest one of the layers. This leads to an increase of the firmness with increased load forces from the top of the product during use.

Figure 4A:
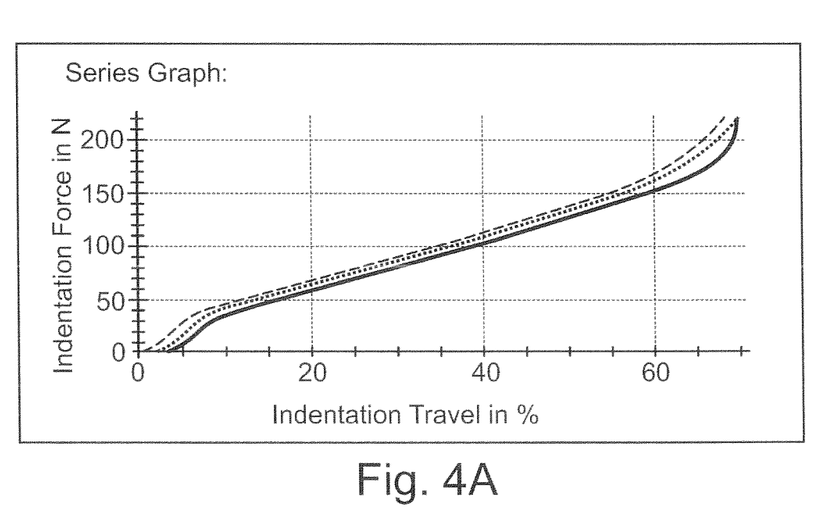
FIGS. 4A and 4B show load deflection curves.
Figure 4B:
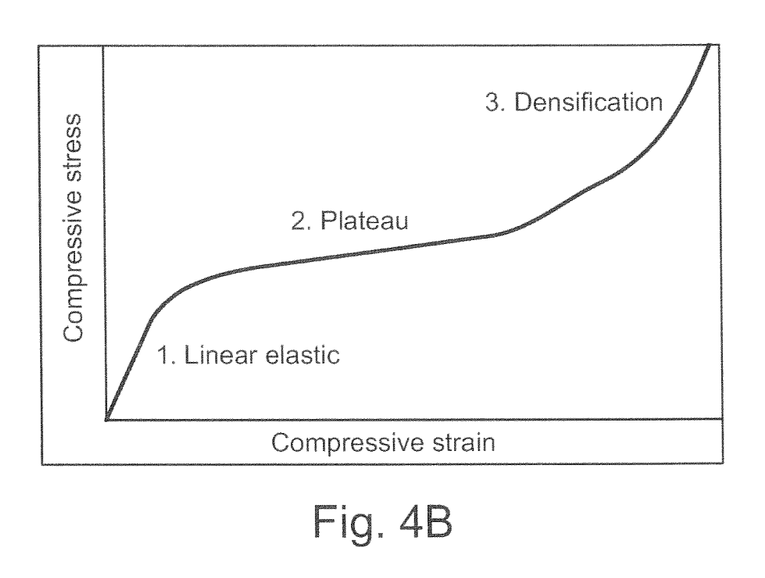

The springs 20 and the foam 30 have different firmness characteristics, which can be demonstrated by examining the load deflection curve, as shown in FIGS. 4A and 4B. FIGS. 4A and 4B are graphs in which increasing flexural loads on a beam are plotted along the vertical axis, and deflections resulting from these loads are plotted along the horizontal axis. Both curves are distinctively different for foam and for springs. FIG. 4A shows the graph for one of the springs 20. It will be seen that the increase of firmness with increasing is very linear, but not in the beginning with a low load.

The same curve for polyurethane flexible foam is seen in FIG. 4B and has a different characteristic. As can be seen the increasing load for the polyurethane flexible foam 30 leads to an increasing firmness at a low load, then the firmness is more or less static with an increasing load, before increasing fast again when the polyurethane foam is compressed completely.

As noted in the introduction, there have been different trials in the past to combine both comfort materials into one product, to form so called hybrid products. It was found that placing both materials (i.e. the springs plus the polyurethane foams in a serial manner) in one product does not lead to a positive combination of both deflection curves, as each of the two different materials keeps its own firmness characteristics.

It had been found that one combination of both materials is the integration of the polyurethane foam 30 into the spring 20 with a mechanical firm connection of the uppermost section 36 of the polyurethane foam 30 to the uppermost section 26 of the springs 20 and the lowest section 34 of the polyurethane foam 30 with the lowest section 24 of the spring 20. This attachment can be made, for example, by means of an adhesive. This combination was found to generate an unexpected behavior of the final product as the combination behaves like an ordinary spring but with a very linear increase of firmness from low to high, until the two materials (both the polyurethane foam 30 and the spring 20) are compressed completely. The polyurethane foam 30 dampens the movement of the spring 20 but the overall combination maintains its resilience as a spring, unless compressed completely. The foam 30 can be sized in a way that the foam 30 does not creep out from between the wire material under load of the spring 20, as this creeping out would destroy the dynamic properties of the combination of the foam 30 and the spring 30 described herein. For example, this condition can be fulfilled by designing the section of the flexible foam 20 to be sufficiently smaller in diameter than the diameter of the spring 20.

Using a thermoelastic foam with a corresponding controller to control the firmness together with the spring 20 enables controlling of the firmness of the shaped body 10 by controlling the firmness of the thermoelastic foam 30. With the air on both side of the thermoelastic foam 30 inside the spring 20, a fast release of excessive thermal energy is possible.

It was also found that it is not necessary to connect all the springs 20 to the polyurethane foam 30. It was found that if one or more of the springs 20 are mechanically connected to the modified spring 20 (with the polyurethane foam), this will lead to those adjacent ones of the springs 20 (without the attachment to the polyurethane foam) to react to the increasing load in a similar way. Thus, only some of the springs 20 in a product have to be modified to achieve the effects described.

EXAMPLES

FIG. 1 shows a typical construction of a section of a shaped body, such as the aforementioned bed, mattress or cushion. Several of these sections can be placed adjacent to each other, either horizontally or vertically or both to form the complete product.

The shaped body 10 shown in FIG. 1 comprises a spring 20 with the uppermost section 24 and the lowest section 26 which is attached to a foam 30 arranged inside the body of the spring 20. The foam 30 has an uppermost section 34 and a lowest section 36 which are attached by affixation, e.g. by an adhesive, through a top plate 44 and a bottom plate 46 to the spring 20. The foam 30 can be a viscoelastic foam as discussed in this document or a conventional foam. The top plate 44 could be at the surface of the mattress and the bottom plate 46 could be at the bottom surface of the mattress or cushion. It is also possible that the top plate 44 and the bottom plate 46 are intermediate layers within the mattress or cushion as long as the top plate 44 and the bottom plate 46 attaches spring 20 and foam 30 with each other. The top plate 44 and/or the bottom plate 46 must therefore be sufficiently mechanically firm to generate parallel behavior and could be made of metal or another plastic.

FIG. 2 shows an alternative construction of the shaped body 10 in which the spring 20 is arranged inside a cylindrically shaped foam 30. The uppermost section 24 of the spring 20 is attached to the upper section 34 of the foam 30 and the lowest section 26 of the spring 30 is attached to the lowest section 36 of the foam 30. In this combination the foam 30 will move outwards under increasing load so that the foam 30 is not creeping out from between the wire of spring 20.

FIG. 3 shows a plurality of metal springs 20 are arranged adjacently along the length of a block shaped piece of the foam 30. This construction could be used, for example, in the aforementioned mattress.

FIG. 3 also shows a temperature generating layer 50 is firmly fixed or glued inside the thermoelastic foam 1. The temperature generating layer 50 is connected by cable to an outside controller 60. One or more sensors 70 on the surface of the shaped body 10 can detect pressure on the shaped body 10 and change the properties of the shaped body 10 and so adjust the firmness of the cushion or mattress.

REFERENCES NUMERALS

10 Shaped body
20 Spring
22 Inner section
24 Uppermost section
26 Lowest section
30 Foam
34 Uppermost Section
36 Lowest section
40 Plate
44 Top plate
46 Bottom plate
50 Temperature generating layer
60 Controller
70 Sensor

What is claimed is:

1. A shaped body, comprising:
   at least one spring and at least one foam section, whereas an uppermost section of the at least one foam section is attached to an uppermost section of the at least one spring, and a lowest section of the at least one foam section is attached to the lowest section of the at least one spring;
   wherein the uppermost section is attached by affixation through a mechanically firm top plate to the at least one spring;
   wherein the lowest section is attached by affixation through a mechanically firm bottom plate to the at least one spring; and
   wherein the at least one spring has an inner section and the at least one foam section is located within the inner section, having a cross-section being smaller in size compared to the size of the inner section of the at least one spring such that under load of up to 8.0 kPa the at least one foam section is adapted to expand only within the inner section of the at least one spring.

2. The shaped body of claim 1, wherein a softness of the at least one foam section is temperature dependent.

3. The shaped body of claim 1, wherein the at least one foam section is located inside the at least one spring or wherein the at least one foam section is wrapped and at least partially abuts the at least one spring.

4. The shaped body of claim 1, further comprising a plurality of springs and at the at least one foam section is enclosed by the plurality of springs.

5. The shaped body of claim 2, further comprising a temperature-regulating device for changing the at least one temperature-dependent foam section.

6. The shaped body of claim 5, further comprising a control device for the temperature regulating device adapted to adjust the firmness of one of the at least one foam section by alteration of temperature of the at least one foam section.

7. A cushion, bed, mattress or pillow comprising the shaped body according to claim 6.

8. The shaped body of claim 1, wherein the at least one foam section comprises a plurality of foam sections.

9. The shaped body of claim 1, wherein the at least one foam section further comprises at least one of a horizontal channel or a vertical channel.

10. The shaped body of claim 1, further comprising a plurality of sensors to measure pressure applied to a surface of the shaped body.

11. The shaped body of claim 1, wherein the at least one foam section being smaller in size compared to the at least one spring so that no part of the at least one foam section is expanding between the wire of the at least one spring under a load of up to 8.0 kPa.

12. A cushion, bed, mattress or pillow comprising the shaped body according to claim 1.

13. The shaped body of claim 2, wherein the at least one foam section is located inside the at least one spring or wherein the at least one foam section is wrapped and at least partially abuts the at least one spring, and further comprising a plurality of springs and at the at least one foam section is enclosed by the plurality of springs.

14. The shaped body of claim 13, further comprising a temperature-regulating device for changing the at least one temperature-dependent foam section.

15. The shaped body of claim 14, further comprising a control device for the temperature regulating device adapted to adjust the firmness of one of the at least one foam section by alteration of temperature of the at least one foam section, and wherein the at least one foam section comprises a plurality of foam sections.

16. The shaped body of claim 15, wherein the at least one foam section further comprises at least one of a horizontal channel or a vertical channel, and further comprising a plurality of sensors to measure pressure applied to a surface of the shaped body.

17. The shaped body of claim 16, wherein the at least one foam section being smaller in size compared to the at least one spring so that no part of the at least one foam section is expanding between the wire of the at least one spring under a load of up to 8.0 kPa.

18. A cushion, bed, mattress or pillow comprising the shaped body according to claim 6.

19. The shaped body of claim 1, wherein the mechanically firm top plate is one or more of metal and plastic, and wherein the mechanically firm bottom plate is one or more of metal and plastic.

* * * * *